(12) United States Patent
Myer et al.

(10) Patent No.: US 7,140,865 B2
(45) Date of Patent: Nov. 28, 2006

(54) APPARATUS FOR MAKING A CORRUGATION-FREE FOAM

(75) Inventors: Wayne J. Myer, Eaton Rapids, MI (US); Blaine M. Kelley, Lansing, MI (US)

(73) Assignee: Dart Container Corporation, Mason, MI (US)

( * ) Notice: Subject to any disclaimer, the term of this patent is extended or adjusted under 35 U.S.C. 154(b) by 607 days.

(21) Appl. No.: 10/063,185

(22) Filed: Mar. 28, 2002

(65) Prior Publication Data

US 2002/0150640 A1    Oct. 17, 2002

Related U.S. Application Data

(63) Continuation of application No. 09/418,165, filed on Oct. 13, 1999.

(60) Provisional application No. 60/105,932, filed on Oct. 28, 1998.

(51) Int. Cl.
   *B29C 47/22*   (2006.01)
(52) U.S. Cl. ................ 425/325; 425/377; 425/380
(58) Field of Classification Search .......... 425/46, 425/325, 377, 380, 467
   See application file for complete search history.

(56) References Cited

U.S. PATENT DOCUMENTS

| 4,049,768 A | 9/1977 | Luthra ................. 264/45.5 |
|---|---|---|
| 4,424,287 A | 1/1984 | Johnson et al. ........... 521/74 |
| 4,636,527 A | 1/1987 | Suh et al. ............... 521/79 |
| 4,657,715 A | 4/1987 | Myers et al. ............ 264/45.5 |
| 4,711,623 A | 12/1987 | Gross et al. ........... 425/382.4 |
| 5,120,481 A | 6/1992 | Brackman et al. .......... 264/51 |
| 5,147,896 A | 9/1992 | York ..................... 521/79 |
| 5,182,308 A | 1/1993 | Voelker et al. ............ 521/79 |
| 5,204,169 A | 4/1993 | York .................... 428/220 |
| 5,250,577 A | 10/1993 | Welsh ................... 521/79 |
| 5,266,605 A | 11/1993 | Welsh .................. 521/146 |
| 5,274,005 A | 12/1993 | Binder et al. ............ 521/82 |
| 5,288,740 A | 2/1994 | Park et al. .............. 521/58 |
| 5,340,844 A | 8/1994 | Welsh et al. ............. 521/82 |
| 5,411,683 A | 5/1995 | Shah .................... 264/50 |
| 5,426,125 A | 6/1995 | Vo et al. ................. 521/97 |
| 5,595,694 A | 1/1997 | Reedy et al. ............. 264/58 |
| 5,622,732 A * | 4/1997 | Beckwith ............... 425/466 |
| 5,652,277 A | 7/1997 | Reedy et al. ............. 521/91 |
| 5,753,717 A | 5/1998 | Sanyasi ................ 264/45.8 |
| 5,762,848 A | 6/1998 | Beckwith .............. 264/176.1 |
| 5,817,261 A | 10/1998 | Reedy et al. ............. 264/54 |

FOREIGN PATENT DOCUMENTS

| EP | 0 079 596 | 5/1983 |
|---|---|---|
| GB | 1060412 | 3/1967 |
| GB | 1225296 | 3/1971 |
| JP | 7040418 A | 2/1995 |

\* cited by examiner

*Primary Examiner*—Duane Smith
*Assistant Examiner*—Emmanuel S. Luk
(74) *Attorney, Agent, or Firm*—McGarry Bair PC

(57) ABSTRACT

A method and apparatus for extruding a corrugation-free polystyrene foam with 100% carbon dioxide as the blowing agent by extruding the extrudate through an annular die opening so that it contacts a choke ring inner surface. A foam made with the apparatus according to the invention will have no visible corrugations and an average cell size of less than 0.35 mm.

48 Claims, 4 Drawing Sheets

APPARATUS FOR MAKING A CORRUGATION-FREE FOAM

CROSS REFERENCE TO RELATED APPLICATIONS

This application is a continuation of U.S. patent application Ser. No. 09/418,165, filed Oct. 13, 1999, which claims priority on U.S. provisional patent application No. 60/105,932, filed Oct. 28, 1998.

BACKGROUND OF INVENTION

1. Field of the Invention

The present invention is directed to a process and an apparatus for producing a corrugation-free foam. Specifically, the foaming process includes the injection and mixing of a predominantly carbon dioxide physical blowing agent into a foamable extrudate and extruding the mixture through an annular die and contacting a restrictive surface within a critical time after the foam exits.

2. Background of the Invention

Low density polymeric foam, such as polystyrene foam, is conventionally made by combining a physical blowing agent with a molten polymeric mixture under pressure and, after thorough mixing, extruding the combination through an appropriate die into a lower pressure atmosphere. This type of foam is commonly used to manufacture plates, bowls, cups and like items.

From about the 1950's to the present, physical blowing agents of choice have included halocarbons, hydrocarbons, specific atmospheric gases, or combinations thereof. Examples of the halocarbons include commercially available halocarbon compositions such as dichlorodifluoromethane (CFC-12), trichlorofluoromethane (CFC-11) and mixtures thereof. Examples of the hydrocarbon blowing agents are the $C_2$–$C_6$ alkanes such as ethane, propane, butane, isobutane, pentane, isopentane, and hexane. Examples of the specific atmospheric gases are carbon dioxide and argon.

During the 1980's, the worldwide scientific community presented evidence linking halocarbons containing halogens other than fluorine, such as chlorofluorocarbons (CFCs) and hydrofluorocarbons (HCFCs) with atmospheric ozone depletion. Consequently, governments sought to regulate CFCs and HCFCs. As a result of such regulations, manufacturers of extruded polymeric foam products were forced to switch to alternatives which have had adverse effects that resulted in increased processing costs, reduced product quality, and increased safety issues, or combinations thereof.

For example, hydrocarbon blowing agents, particularly the short-chained alkanes produce foam with satisfactory physical properties. However, depending upon the location of the factory and the amount of the blowing agent used, a manufacturer may be required to capture and destroy emissions of the hydrocarbon blowing agents through a processing step like incineration. Atmospheric emission of short-chained hydrocarbons, which are classified as photoreactive volatile organic compounds (VOCs), when combined with certain other gases and subjected to sunlight, may result in "smog". Moreover, the flammability of the hydrocarbons requires elaborate control systems and costly ventilation systems to prevent the exposure of highly flammable blowing agent-and-air mixtures to ignition sources. Similar to hydrocarbon blowing agents, certain hydrofluorocarbon blowing agents, such as 1,1-difluoroethane (HFC-152a), produce foam with satisfactory physical properties, but have the adverse effect of flammability. In addition, the nearly ten-fold higher unit pricing of these hydrofluorocarbon blowing agents in relation to most of the hydrocarbon blowing agents adversely increases foam product costs.

The disadvantages of the prior blowing agents have led to the use of carbon dioxide as a blowing agent. Carbon dioxide does not have the adverse environmental and flammability characteristics associated with CFCs and HCFCs. Carbon dioxide has a molecular weight that is lower than most of the commercially used hydrocarbons and the hydrofluorocarbons and thereby requires lower usage rates. Carbon dioxide also has lower unit pricing than the commercially used hydrocarbons and hydrofluorocarbons. However, the foams made with higher levels of carbon dioxide have not been comparable to foams made with hydrocarbon or with hydrofluorocarbon blowing agents. The foams made with blowing agents that are primarily carbon dioxide have generally had both increased product cost and decreased product quality. The increased cost is attributable to a combination of reduced extrusion rates and limited post-expansion in secondary operations, which results in increased product weight. The reduced product quality is attributable to both diminished aesthetics and increased variability in the mechanical properties.

The diminished aesthetics of foam produced with carbon dioxide is generally related to larger cell size, often greater than 0.4 mm, which give such foams a poor, grainy texture, and to the presence of multiple visible parallel regions of light and dark in the foam substrate. These adjacent parallel regions are not only deleterious to the visible aesthetics of the foams, but also create significant localized differences to mechanical properties.

The physical property that both diminishes aesthetics and increases the variability of the mechanical properties of foams made with carbon dioxide is related to the low solubility of the carbon dioxide gas in the polymer at ambient atmospheric conditions. The low solubility results in a very high volumetric expansion rate of the foamable composition at the die. As a consequence of this high volumetric expansion rate of the foam at the die, the use of a physical blowing agent comprised primarily of carbon dioxide in the production of fine-celled foams having a foam density below about 100 kg/m$^3$ or a cell size below about 0.40 mm causes corrugation. The severity of the corrugations tends to increase as either the density or the cell size is decreased. The corrugations are manifest as periodic bands which are oriented in the machine direction within the extruded foam sheet and which differ in cell size, cell shape, and often foam thickness from the majority of the foam. The corrugations not only detract from the aesthetics but also reduce the overall mechanical properties of parts made from the foam.

In most food service and beverage applications, it is preferred that the average cell size be about 0.20–0.30 mm, which provides the foam with an aesthetically pleasing, relatively smooth surface texture while maintaining the requisite mechanical properties strength. Smaller cell sizes tend to undesirably sacrifice a smoother finish for strength. Larger cell sizes tend to have an undesirable appearance.

When used as the sole blowing agent, carbon dioxide's very high volumetric expansion rate typically produces unacceptable levels of corrugation. Therefore, previous attempts to use carbon dioxide as a blowing agent to produce a commercially acceptable foam product focused on blending the carbon dioxide with another blowing agent. The blended blowing agents typically included carbon dioxide as a minor constituent and either a hydrocarbon or hydrofluorocarbon blowing agent as the predominant constituent. A common blended blowing agent would include carbon dioxide in combination with pentane. Typically, the carbon dioxide in the blended blowing agent was limited to 30 mole percent of the blended blowing agent, which reduced, but did not eliminate, the use of a hydrocarbon or hydroflurocarbon-blowing agent. Thus, the blended blowing agent still has the disadvantages of the hydrocarbon and hydroflurocarbon blowing agents.

Attempts were also made to produce a commercially suitable polystyrene foam with substantially 100 percent carbon dioxide as the blowing agent. Examples of such processes and foams are disclosed in U.S. Pat. Nos. 5,266,605, 5,340,844, and 5,250,577. Most of these foams had an average cell size of 0.36 mm and still contained visible corrugation. Although these foams would be suitable for some applications, they did not produce corrugation-free foams with cell sizes in the preferred range.

Referring to FIGS. 1 and 2, Applicants previously produced a corrugation-free polystyrene foam with 100 percent carbon dioxide as the blowing agent from a tandem extruder, which is commonly known in the industry, in combination with a choke ring annularly positioned around an annular die extrusion opening.

The two-stage extruder apparatus comprises a hopper A feeding material into a first extruder B where polystyrene resin material is heated and melted in heating zone C, mixed with a blowing agent delivered by an injector D, further mixed by a mixing zone E, and cooled in a second stage extruder in a cooling zone F before delivery to a die G. The choke ring H contacts the exiting extrudate before a sizing mandrel I sizes the sheet.

The previously-used choke ring 10 and die 12 are shown in more detail in FIG. 2. The choke ring 10 has a smooth temperature-regulated inner surface 11 that is positioned to be concentric with the die 12 so that extrudate 13 contacts inner surface 11 before reaching the sizing mandrel 15.

The previously-used die 12 comprises a first generally converging portion 16 that terminates at an annular die opening 18. A second converging portion 20 extends from the annular die opening 18 and terminates at a cylindrical portion 22.

The choke ring surface 11 and the annular die opening 18 are located a radius of $r_c$ and $r_d$, respectively, from the longitudinal axis 24. The choke ring gap is the difference between the radii $(r_c-r_d)$.

Two choke rings having different diameters were tried. The first choke ring had a diameter such that the gap was 0.2375 inches or 6.03 millimeters. The second choke ring had a gap of 0.18 inches or 4.57 millimeters, resulting in a contact time of approximately 0.37 ms for the given operational parameters. Although both of these choke rings produced corrugation-free foam, the cell size remained above 0.40 mm. Therefore, there is still a need for a polystyrene foam and method of making a polystyrene foam that is corrugation-free with a cell size in the preferred range and using a carbon dioxide blowing agent.

SUMMARY OF INVENTION

The invention relates to a corrugation-free foam and an apparatus and method for making the corrugation-free foam. The foam is preferably made in an extrusion apparatus that extrudes a polymeric foam from an extrudate comprising a polymeric resin and a blowing agent. The blowing agent provides the extrudate with a cellular structure upon extrusion. The apparatus can comprise an extruder having an inlet that is adapted to receive the extrudate. An extrusion die is provided on the extruder and forms an outlet for the extruder. The extrusion die defines a longitudinal axis and has an annular die opening that is concentrically oriented relative to the longitudinal axis and positioned a first radial distance from the axis. The apparatus further comprises a choke ring having an opening defined by an annular choke ring surface. The choke ring is positioned relative to the extruder such that at least a portion of the die is received within the choke ring opening. The choke ring opening is preferably positioned concentrically about the longitudinal axis and is positioned a second radial distance therefrom. The difference between the second radial distance and the first radial distance defines the gap between the choke ring and the die. The foam is extruded from the extrusion die through the choke ring at a preselected line speed. As the foam leaves the extrusion die, it contacts the choke ring during an interval of time termed the contact time.

The contact time is a function of the line speed and the gap between the choke ring and the die. The contact time in seconds is equal to the ratio of the gap size in millimeters (mm) divided by the line speed in millimeters per second of the extrudate as it leaves the die opening, with the ratio being between 0.001 and 0.020 seconds. The choke ring gap is less than 4.6 mm and is preferably less than or equal to 0.8 mm. The gap can be specified as the difference between the first and second radial distances. It can be specified in terms of the combination of a selected line speed and a ratio value between 0.001 and 0.020 seconds. The gap size can also be specified in terms of a selected contact time for a given range of line speeds.

The die can be of any suitable shape; however, it is preferred that the die is symmetrical relative to the longitudinal axis. It is also preferred that the die has a generally cylindrical body with an annular slot defining the die opening. The generally cylindrical body can include an annular ridge extending from the cylindrical body and terminating in a peak in which the annular slot is located.

The extrudate is preferably kept constrained against the choke ring surface for a constrainment time of 5–7 ms and preferably between 8–50 ms. The blowing agent can be a blend but is preferably 100% carbon dioxide. The rate, i.e. the line speed, at which the extrudate is pulled through the annular choke ring opening can range from 50 mm/second to 250 mm/second. It is preferred that the contact time be less than 8 ms and more preferably be 5 ms or less.

In an alternate form of the method, the polymeric foam is formed by mixing a polymeric resin and a blowing agent consisting substantially of 100% carbon dioxide, extruding the extrudate from the annular die opening and through the choke ring gap, and controlling the extruded foam so it has an average cell size of 0.20 mm to 0.25 mm.

In another alternate form, the method relates to forming the extrudate by mixing a polymeric resin and a blowing agent comprising a blowing agent blend and extruding the extrudate through the choke ring gap.

The invention also relates to a foam, preferably made in accordance with the above methods, having an average cell size of 0.20 mm–0.35 mm. The average cell size is preferably less than 0.30 mm. Such a foam will have no visible corrugation. Preferably, the foam will be corrugation-free. The foam can be made in a foam sheet, which has a thickness preferably of 1–4 mm.

DETAILED DESCRIPTION

The invention is both a corrugation-free foam and an apparatus for making the corrugation-free foam. The corrugation-free foam is preferably made using the prior art tandem extruder with an improved choke ring alone or in combination with an improved die. The improvement in the choke ring permits the production of a polystyrene foam with 100% carbon dioxide blowing agent having a fine cell structure with the average cell size being between 0.20 mm and 0.35 mm. It heretofore was thought impossible to produce such a corrugation-free foam with such a fine cell size by using carbon dioxide as a blowing agent.

Figure 1:
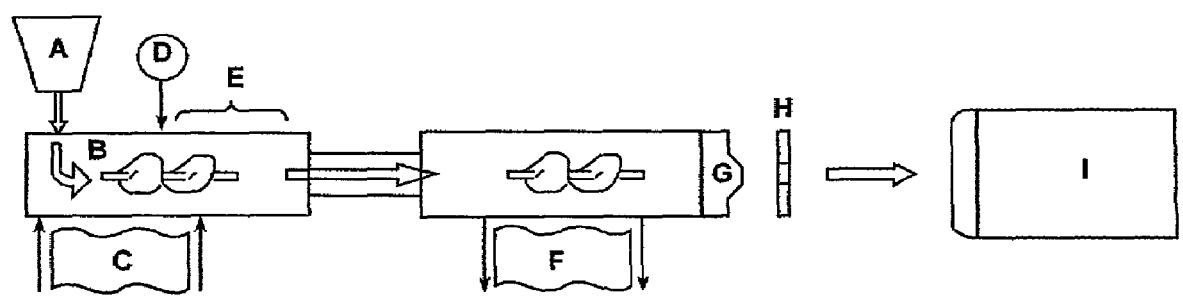
FIG. 1 is a block diagram illustrating the major functional components of a prior art foam extrusion system, including a choke ring surrounding an extrusion die.
Figure 2:
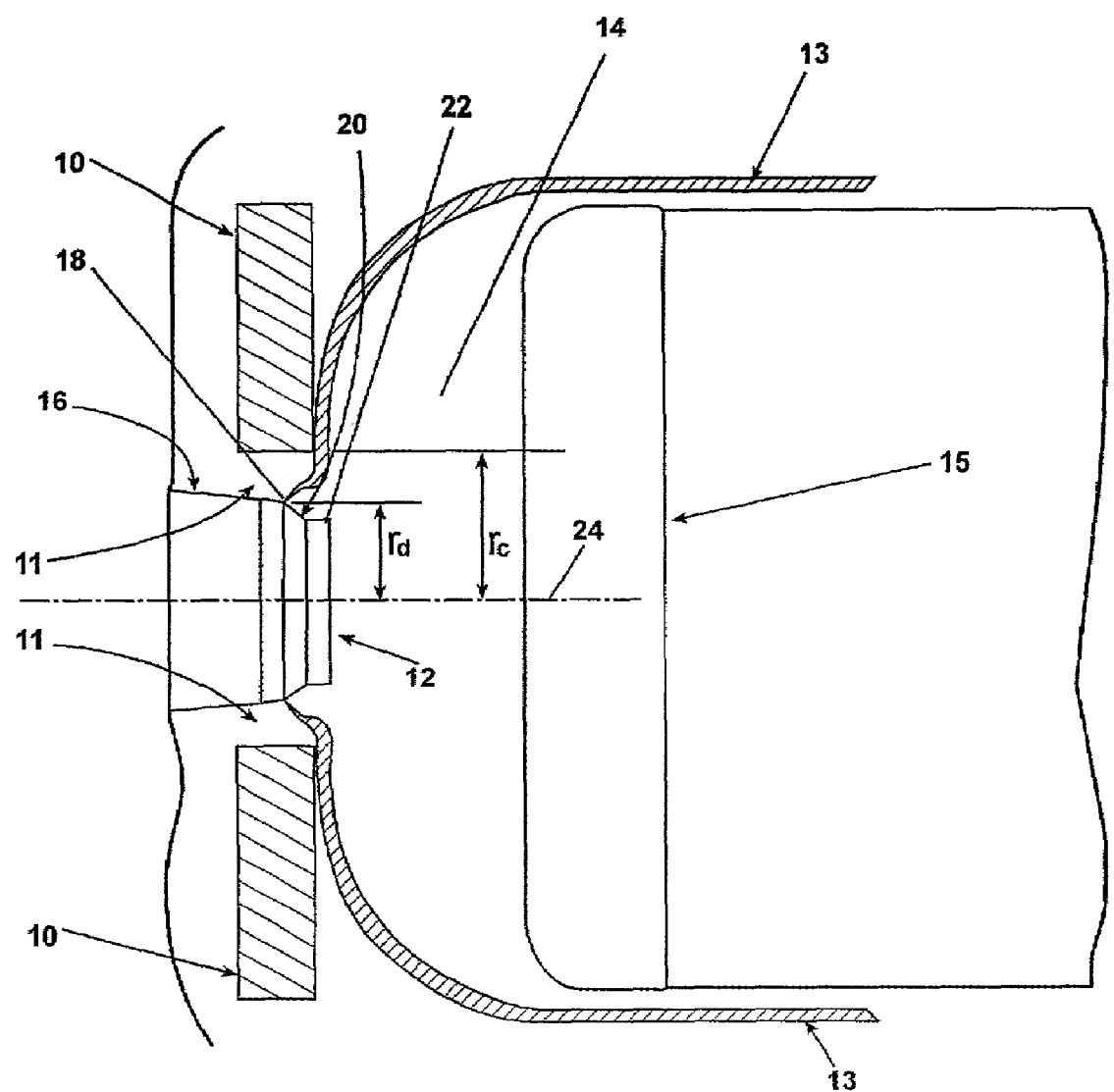
FIG. 2 is an enlarged sectional view of the prior art choke ring and die of FIG. 1, illustrating the relationship between the choke ring, die, and sizing mandrel of the apparatus and the corresponding interaction of the foam.
Figure 3:
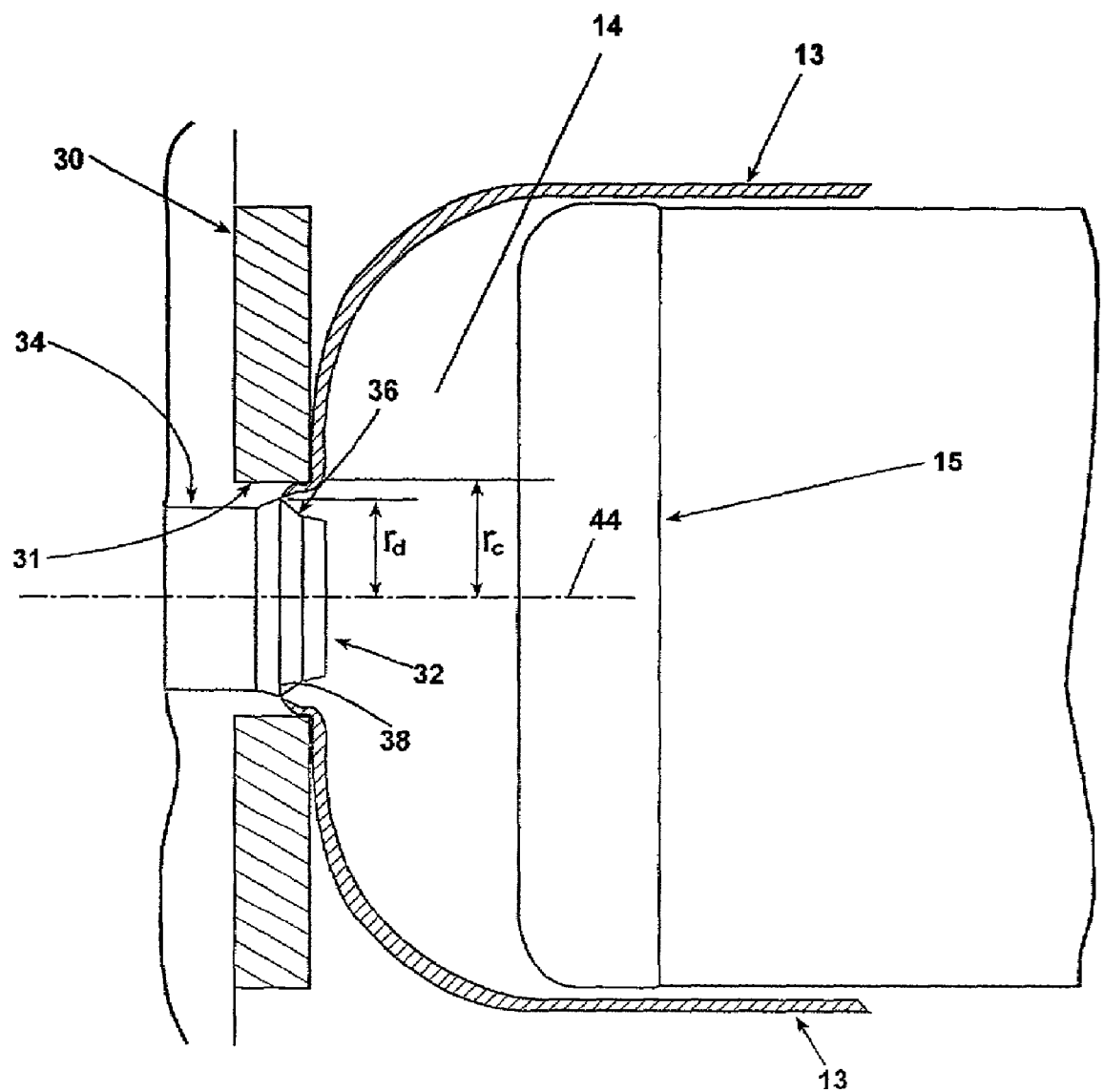
FIG. 3 is a view similar to FIG. 2 and illustrating a choke ring and die according to the invention.
Figure 4:
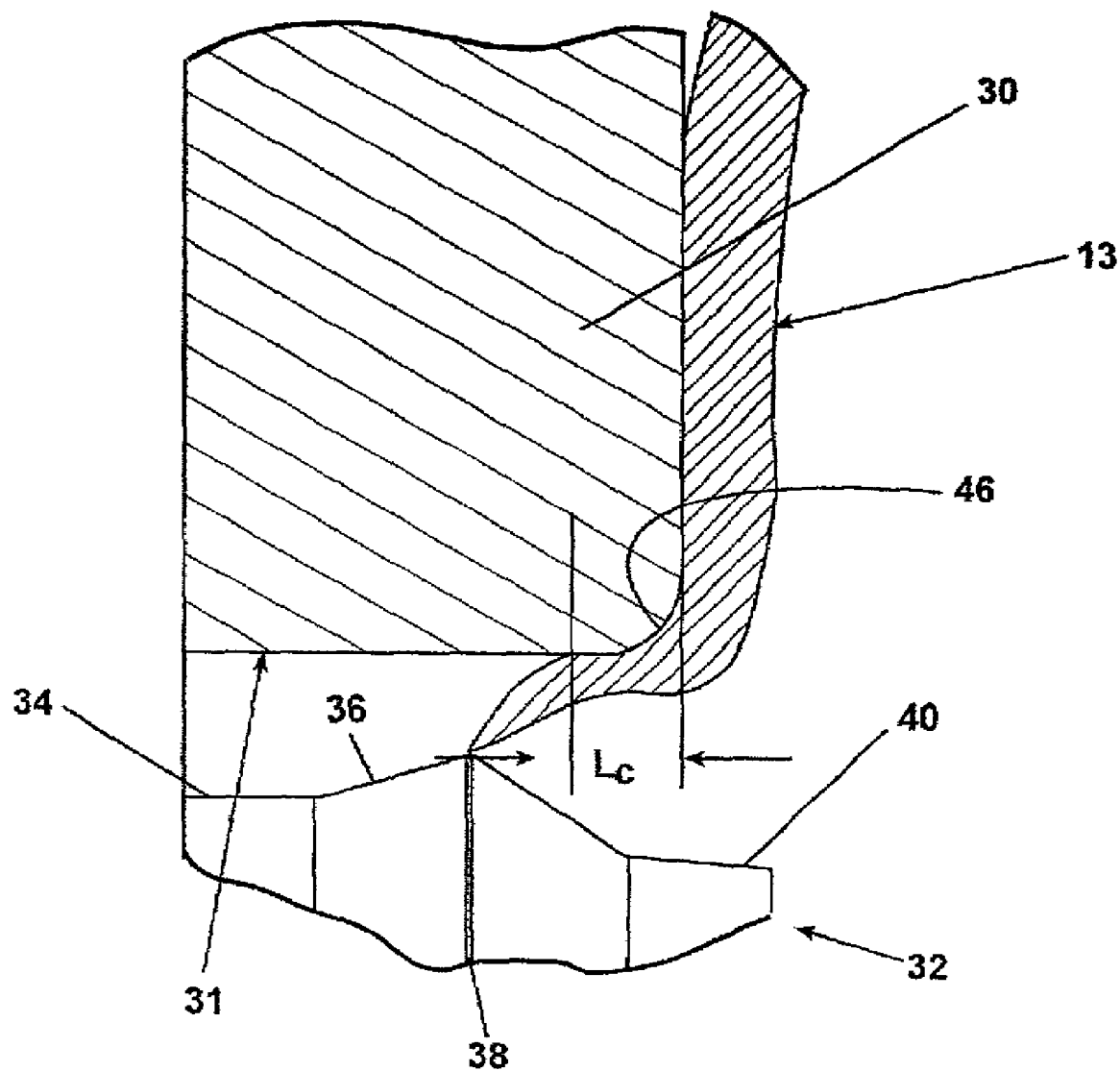
FIG. 4 is an enlarged sectional view showing the relationship between the choke ring and die according to the invention.

FIGS. 3 and 4 illustrate the improved choke ring 30 along with the new annular die 32. The choke ring 30 and annular die 32 are disclosed in the context of the prior art tandem extruder configuration of FIG. 1. Therefore, similar parts in the figures will be identified by the same numerals.

The choke ring 30 has an annular inner surface 31 which is concentrically oriented with respect to a longitudinal axis 44 so that the inner surface 31 is located a radial distance $r_c$ from the longitudinal axis 44. Similarly, the annular die 32 is concentrically oriented with respect to longitudinal axis 44 and the die opening 38 is positioned a radial distance $r_d$ from the longitudinal axis 44. The difference between the radial distances, $r_c - r_d$ is preferably less than 4.57 mm.

Unlike the prior art dies, the die 32 according to the invention does not taper from the base to the tip of the die. Instead, the annular die 32 has an outer periphery with an annular die opening 38 located in the outer periphery and forming an outlet for the extruder. The outer periphery of the extrusion die 32 is located at the annular die opening 38. The die 32 begins at its base with a generally constant cross section portion 34, which transitions into an outwardly directed radially converging portion or collar 36, in whose apex the annular die opening 38 is formed. The die then ends with a slightly tapered cross section portion 40. The advantage of the die 32 over the prior art die 12 is that the die outlet opening forms the largest outer diameter of the die 32; no other portion of the die 32 can interfere with the insertion of the die into the choke ring opening defined by the choke ring inner surface 31, especially for the very small gap sizes required by the invention.

The choke ring 30 preferably comprises a smooth, temperature-regulated surface concentric to the annular foam die positioned in such a manner as to direct but not reduce the flow of the foamable extrudate as it leaves the die. Preferably an adjustment mechanism of the choke ring apparatus allows the smooth, temperature-regulated surface 31 to be reproducibly positioned along the extrusion direction axis and be held concentric with the exit of die 32. An example of a suitable adjustment mechanism is one that can adjust the up/down, side-to-side, and upstream/downstream position of the choke ring relative to the annular die 32. Worm gears or similar mechanism can be used to make the adjustments.

It is also contemplated that the inner surface of the choke ring of the present invention can be constructed from any material that is solid at the temperature of the foamable extrudate. It is further contemplated that the inner surface of the choke ring can be constructed of any sintered material. The preferred materials of construction for the choke ring are thermoplastic polymeric materials with a glass transition temperature or melting temperature above about 160 C, thermoset polymeric materials, and metallic materials. Examples of suitable thermoplastic materials include polytetrafluoroethylene, polyacetal, polyamides, polyesters, and polyoxymethylene, and crosslinked polyolefins. Examples of thermoset materials include phenolics and epoxy resins. Examples of metallic materials include aluminum, carbon steel, and stainless steel. It is contemplated that materials of higher thermal conductivity are more effective as materials of construction of the inner surface of the choke ring. The most preferred material of construction for the inner surface of the choke ring is aluminum.

It is contemplated that the inner surface of the choke ring of the present invention can be configured with any suitably-shaped curve that will allow the expanding foamable composition to remain continuously constrained by the temperature-regulated surface for a time period of from about 5 to about 75 ms. The choke ring inner surface can preferably be configured to have diametrically opposing boundaries of the inner surface of the choke ring which are parallel lines, non-parallel lines, convex curves or concave curves. For examples in which the diametrically opposing sides of the choke ring are parallel lines, the boundaries of the inner surface describe a cylinder. For examples in which the diametrically opposing sides of the choke ring are non-parallel, the boundaries of the inner surface describe a frustoconical section of a cone.

The apex of the cone formed by a projection of the inner surface boundaries may be upstream or downstream of the die face. The term "converging angle" is used herein to describe the angle formed if the apex of the cone formed by the projection of the inner surface boundaries is downstream of the extruder. The term "diverging angle" is used herein to describe the angle formed if the apex of the cone formed by the projection of the inner surface boundaries is downstream of the extruder. In one example in which the diametrically opposing sides of the choke ring form a convex curve, the boundaries of the inner surface describe a section of a paraboloid. The vertex of said paraboloid formed by projection of the choke ring inner surface boundaries may be upstream or downstream of the die face. In one example in which the diametrically opposing sides of the choke ring form a concave curve, the boundaries of the inner surface describe an inner section of a torus.

Preferred configurations for the inner surface 31 of the choke ring are frustoconical sections with a diverging angle, cylinders, and frustoconical sections with a converging angle. The converging angle or diverging angle is measured using the extrusion direction axis as the base. The most preferred configurations for the choke ring inner surface are a frustoconical section of a cone having a converging angle less than about 20°, a cylinder, and a frustoconical section of a cone having a diverging angle less than about 30°. The most highly preferred configurations for the choke ring surface are a frustoconical section of a cone having a converging angle less than 10°, a cylinder, and a frustoconical section of a cone having a diverging angle less than about 10°.

It is contemplated that a downstream end 46 of the inner surface of the choke ring can be any configuration that will allow the foam to begin radial expansion without tearing of the foam surface. Preferred configurations for the downstream end of the inner surface of the choke ring are a radius in the range of from 0.4 mm to about 7.0 mm. The most preferred configuration for the downstream end 46 of the inner surface of the choke ring is a radius in the range of from about 1.5 mm to about 3.5 mm.

It is further contemplated that the convective fluid used for temperature regulation of the choke ring can be any fluid that is conventionally used for cooling or heating applications as long as said fluid is not subject to thermal decomposition at the extrudate temperature and said fluid will not react with the material of construction of the choke ring. Examples of convective fluids include water, ethylene glycol-water mixture in any proportions, and commercial low viscosity thermal oils commonly used for heat transfer application. The preferred convective fluid for the temperature regulation of the choke ring is water.

The support for the choke ring inner surface can be any support that will enable positioning of the inner surface to be concentric with the annular die. The support can be attached to the extruder frame, the die body or the floor. The support is preferably attached to the body of the die.

Broadly, the process of the present invention combines an alkenyl aromatic polymer, a nucleating agent, a physical blowing agent consisting of at least 15 mole percent carbon dioxide and optionally one or more auxiliary physical blowing agents, and optional colorants and additives in the extruder B to form a foamable alkenyl aromatic polymer composition or extrudate. The foamable extrudate is pressurized above a particular threshold pressure specific to the composition and released to an area of lower pressure through an annular die G. The temperature-regulated annular choke ring H is positioned so that, within a contact time period of about 20 ms or less after the foamable extrudate 13 exits the die G, the outer surface of the extruded material 13 is forced into contact with the smooth inner surface 31 of the choke ring 30 in a manner that deflects the outer surface of extrudate 13 but does not restrict the flow through the die 32 or damage the surface of the foam. The contact with the choke ring surface 31 is maintained for a constrainment time period in the range of from about 5 to about 75 ms. The foam extrudate 13 is then allowed to expand freely in the radial direction and is drawn at constant line speed over a mandrel 15 which has a radius of about 1.5 to about 6.0 times the radius of the annular choke ring 10 to form a substantially corrugation-free alkenyl aromatic polymer foam.

The corrugations sought to be eliminated or reduced by the invention are well known in the art and comprise multiple parallel regions formed on the extruded sheet that are oriented in the extrusion direction and which are apparent to the unaided eye of an observer through either visible light reflection or visible light transmission. The least severe corrugations are those in which the multiple parallel regions are visible only by transmitted light. Moderate corrugations are those which are visible by reflected light and may have slight localized thickness variations that are perceptible to human touch. Severe corrugations are those which also result in significant thickness difference between widths that are less than about 4 percent of the overall sheet width. Extremely severe corrugation describes the condition when adjacent parallel segments actually join together across the width direction to produce an overlap or even "S" folded cross-section in the thickness direction.

Mechanical properties of solid materials, such as flexural stiffness and tensile strength, are directly relatable to the mass distribution of the substrate. Thus, mechanical properties of foam are likewise directly dependent on the amount of solid mass or the localized density of the foam. Corrugated foam generally has localized variations in density. Consequently, since lower density means lower strength, corrugations are thus deleterious to the overall mechanical properties of the foam.

Looking at the process in more detail and according to one embodiment of the present invention, the process for producing substantially corrugation-free alkenyl aromatic polymer foam begins by feeding pellets of an alkenyl aromatic polymer into the extruder hopper A. The polymer along with 0.02 to about 2.0 weight percent of pelletized talc nucleating agent and 0 to about 2-percent of optional additives, colorants, and fire retardants are fed by gravity into the hopper A. (All weight percentages relate to the weight of the extrudate, unless otherwise noted.) The polymeric-talc-additives mixture is conveyed through the hopper A into the first extruder B and heated at the heating zone C to a temperature sufficient to form a polymeric-talc-additives blend.

A physical blowing agent consisting preferably solely of carbon dioxide and optionally one or more members selected from the group consisting of fully hydrogenated hydrocarbon blowing agents, partially fluorinated blowing agents, and combinations thereof, is added at the injector D of the extruder in an appropriate ratio to the target density. Preferably, the carbon dioxide comprises 1 to 3 weight percent and is injected in a liquid state. The polymeric-talc-additives blend and physical blowing agent are thoroughly mixed in the mixing zone E, transferred to the second extruder, and subsequently cooled in a cooling zone F to a temperature sufficient to form foam. The cooled foamable extrudate consisting of the polymeric-talc-additives-physical blowing agent is extruded through an annular die into a lower pressure region on the downstream side of the die G.

It is worth noting that carbon dioxide as used herein refers to commercially available carbon dioxide. Commercially available carbon dioxide is not pure and contains some contaminants. It is preferable to use 100% carbon dioxide.

As shown in FIGS. 3 and 4, the expansion of the extruded foamable composition is restricted by the choke ring 30, while making contact with the smooth temperature-regulated inner surface 31, which is concentric with the annular die 32. The inner surface 31 is sized so that the foamable composition contacts the inner surface of the choke ring within a contact time period of between about 1 and 20 ms. The foam is drawn over the inner surface 31 of the choke ring 30 and held there against it for a constrainment time period of between about 5 and 75 ms. The resulting foam 13 is then allowed to expand freely in a radial direction in the form of an air bubble 14 of regulated pressure, drawn over a cylindrical sizing mandrel 15 that has a diameter that is 1.5 to 6.0 times that of the annular die, and collected on any conventional sheet collection device. The resulting alkenyl aromatic polymer foam of the present invention is free of visible corrugations. The foam preferably has no corrugations visible to the eye by light transmission.

The polymeric foams produced by the present invention are generally of a density of from about 30 kg/m$^3$ to 120 kg/m$^3$. The polymeric foams produced by the present invention generally have an average cell size from about 0.20 mm to about 0.35 mm. The polymeric foams are produced with uniform and consistent physical properties. The polymeric foams are substantially free of even the least severe corrugations. The polymeric foams are light in weight and can be converted into plates, cups, and bowls. Other contemplated applications for the polymeric foams produced by the present invention include uses in insulation, toys, and low impact protective packaging applications.

The polymeric foam produced by the present invention preferably has a thin cross-section in the thickness direction of the foamed structure that is less than about 5 mm. The preferred dimension in the thickness direction of the foamed product is from about 1.0 to 4.0 mm.

The "average cell size" as used herein is defined as the mean of the cross direction cell size and the extrusion direction cell size. The extrusion direction cell size and cross direction cell size are measured in conformance to ASTM Method D3676. The average cell size is in the range of about 0.15 to about 0.60 mm. The most preferred average cell size is in the range of about 0.20 to about 0.35 mm in order to obtain the most commercially desirable combination of finish, strength, and density. The contact time is a characteristic time period required by an element of the foamable composition on the outer surface of the expanding foamed structure to travel the distance from the annular die outlet opening to the inner surface 11 of the choke ring 10. The contact time is calculated by dividing the distance between the choke ring inner surface and the die outlet (in units of length such as mm) by the line speed (in units of length/time such as mm/sec) used in drawing the foam over the mandrel.

That is:

$$t_{c0} = (r_c - r_d)/L$$

where $t_{c0}$ is the contact time (in sec), $r_c$ is the mean radius of the choke ring inner surface (mm), $r_d$ is the radius of the annular die at the die gap (mm), and L is the mean line speed of downstream equipment (mm/sec)

The preferred contact time is from about 1.0 to about 20 ms. The most preferred contact time is from about 1.0 to 8 ms. The most highly preferred contact time is from 1.0 to 5.0 ms. A preferred range of line speeds is 50 to 300 mm/s, with the most preferred line speed being 150–250 mm/s.

The constrainment time is preferably a characteristic time period that an element of the foamable composition on the outer surface of the foamed structure actually travels along the inner surface of the choke ring. The constrainment time is calculated by dividing the length of the choke ring inner surface that is downstream of the annular die exit (in units of length such as mm) by the line speed (in units of length/time such as mm/sec) used in drawing the foam over the mandrel.

That is:

$$t_{c1} = l_c/L$$

where $t_{c1}$ is the constrainment time (in sec), $l_c$ is the contact length of the choke ring inner surface (mm), L is the mean line speed of downstream equipment (mm/sec)

The preferred constrainment time is from about 5 ms to about 75 ms. The most preferred constrainment time is from about 8 ms to about 50 ms. A preferred range of line speeds is 50 to 300 mm/s, with the most preferred line speed being 150–250 mm/s.

The alkenyl aromatic polymer preferably includes polymers of aromatic hydrocarbon molecules that contain an aryl group joined to an olefinic group with only double bonds in the linear structure, such as styrene, α-methylstyrene, o-methylstyrene, m-methylstyrene, p-methylstyrene, α-ethylstyrene, α-vinylxylene, α-chlorostyrene, α-bromostyrene, vinyl toluene and the like. Alkenyl aromatics polymers include homopolymers of styrene (commonly referred to as polystyrene) and copolymers of styrene and butadiene (commonly referred to as impact polystyrene).

The contact time, constrainment time, the choke ring gap size, and the line speed are interdependent or, in other words, functions of each other. Although the contact time and constrainment time are useful for quantifying operational range of the process for obtaining a corrugation-free foam according to the invention, testing has also shown that the currently preferred choke ring gap of 0.03 inches produces corrugation-free foam with a 0.20–0.35 mm average cell size for the current range of line speeds.

The polystyrene resin or polystyrenic material preferably includes homopolymers of styrene, and styrene copolymers comprised of at least 50 mole percent of a styrene unit (preferably at least about 70 mole percent) and a minor (i.e. less than 50 mole percent) proportion of a monomer copolymerizable with styrene. The term "polystyrene resin" or "polystyrenic material" as used herein also includes blends of at least 50 percent by weight of the styrene homopolymer (preferably at least about 60 weight percent) with another predominantly styrenic copolymer. The physical blends are combined in a dry form after the blends have been polymerized.

The polystyrene resin that can be used in the polymeric mixture can be any of those homopolymers obtained by polymerizing styrene to a weight average molecular weight ($M_w$) of from about 100,000 to about 450,000 (commonly referred to as crystal polystyrene), can be any of those copolymers obtained by polymerizing styrene and from about 3 to 20 mole percent butadiene to a weight average molecular weight ($M_w$) of from about 100,000 to about 350,000, or can be any of those graft copolymers obtained by polymerizing a blend of polymerized styrene upon a nucleus of styrene-butadiene rubber (SBR) to a weight average molecular weight of from about 100,000 to about 350,000 (commonly referred to as impact polystyrene).

The preferred crystal polystyrenes are uncrosslinked homopolymers of styrene and have a melt flow index of from about 0.5 to about 15.0 dg/min. as measured by ASTM D1238 (nominal flow rate at 200 C and 689.5 kPa). The most preferred crystal polystyrene is uncrosslinked polystyrene having a melt flow index from about 1.0 to 3.0 dg/min.

Impact polystyrenes are generally classified as medium impact polystyrene (MIPS), high impact polystyrene (HIPS) or super high impact polystyrene (S-HIPS). The butadiene level of the impact polymer is preferably in the range of from about 3 to about 10 weight percent of the copolymer (polybutadiene and polystyrene). The most preferred butadiene level is in the range of from about 5 to 8 weight percent of the copolymer. The impact polystyrene generally has a melt flow index of less than about 25 dg/min., and preferably less than about 8 dg/min. The most preferred impact polystyrenes are uncrosslinked HIPSs having a melt flow index of from about 2.2 to 3.2 dg/min. as measured by ASTM D1238 (nominal flow rate at 200 C and 689.5 kPa), and a Notched Izod Impact of from about 9 to about 13 kg-cm/cm as measured by ASTM D256. The Notched Izod Impact is the energy required to break notched specimens under standard conditions and is work per unit of notch. Therefore, a higher Notched Izod Impact indicates a tougher material.

The alkenyl aromatic polymer of the present invention can be obtained by blending two or more alkenyl aromatic polymers. For example, blends of crystal polystyrene and impact polystyrenes such as crystal polystyrene and HIPS, may be blended to comprise the alkenyl aromatic polymer of the present invention.

The nucleating agent preferably includes any conventional or useful nucleating agent(s) used to adjust the size of the cells in the foamed structure to the target size desired. The term "cell size control agent" has also been used interchangeably in the art. The amount of nucleating agent to be added depends upon the desired cell size, the selected blowing agent, and the density of the alkenyl aromatic polymer foam composition. The nucleating agent is generally added in amounts of from about 0.02 to 2.0 weight percent of the polymeric composition. Nucleating agents may be inorganic or organic compounds and are generally available in a small particulate form.

Examples of inorganic nucleating agents include clay, talc, silica, and diatomaceous earth. The preferred organic nucleating agents include those compounds which decompose or react at the heating temperature within the extruder to evolve gas. Examples of these preferred organic nucleating agents include polycarboxylic acids and alkali metal salts of a polycarboxylic acid in combination with a carbonate or bicarbonate. Some specific examples of an alkali metal salt include, but are not limited, to the monosodium salt of 2,3-dihydroxy-butanedioic acid (commonly referred to as sodium hydrogen tartrate), the monopotassium salt of butanedioic acid (commonly referred to as potassium hydrogen succinate), the trisodium and tripotassium salts of 2-hydroxy-1,2,3-propanetricarboxylic acid (commonly referred to as sodium and potassium citrate respectively), and the disodium salt of ethanedioic acid (commonly referred to as sodium oxalate). An example of a polycarboxylic acid is 2-hydroxy-1,2,3-propanetricarboxylic acid (commonly referred to as citric acid). Some examples of a carbonate or a bicarbonate include, but are not limited to, sodium carbonate, sodium bicarbonate, potassium carbonate, and calcium carbonate.

It is contemplated that mixtures of inorganic and organic nucleating agents can also be used in the present invention. The most preferred nucleating agent is talc. Talc is preferably added in a powder form, but may also be added in a carrier. If added in a carrier, the talc concentration is preferably between 20 to 60 weight percent in an alkenyl aromatic polymer which is preferably a styrene homopolymer.

The physical blowing agent for this invention includes at least 15 mole percent, preferably at least 50 mole percent, carbon dioxide and optionally one or more auxiliary physical blowing agents. The most preferred amount is 100 percent carbon dioxide to provide the greatest positive environmental and safety characteristics. The carbon dioxide blowing agent can be used at a rate of about 0.1 to 4.0 weight percent, but preferably about 1.0 to about 3.0 weight percent, of the total extruder feed rate.

The auxiliary physical blowing agent comprises at least 1 mole percent, and preferably at least 5 mole percent, but less than 85 mole percent of the total blowing agent. More than one auxiliary physical blowing agents may also be included. Examples of auxiliary physical blowing agents include but are not limited to organic physical blowing agents.

The organic auxiliary physical blowing agents preferably includes organic chemical compounds that have boiling points less than about 37 C. These organic compounds include, but are not limited to, fully hydrogenated hydrocarbons and partially fluorinated hydrocarbons which may be considered to be flammable. Flammable as defined herein generally includes those materials having flashpoints less than about 37.8 C.

Examples of fully hydrogenated hydrocarbon blowing agents include the initial members of the alkane series of hydrocarbons that contain up to six carbon atoms. Preferably, the hydrogenated hydrocarbon blowing agents are not regulated by governmental agencies as being specifically toxic to human or plant life under normal exposure. The preferred $C_1$–$C_6$ alkane compounds include methane, ethane, propane, n-butane, isobutane, n-pentane, isopentane, n-hexane, and blends thereof. The most preferred fully hydrogenated hydrocarbon auxiliary physical blowing agents are the $C_4$–$C_5$ and blends thereof.

The preferred partially fluorinated hydrocarbons auxiliary physical blowing agents are hydrofluorocarbon gases that have molecules which contain up to three carbon atoms without any other halogen atoms other than fluorine. These partially fluorinated auxiliary physical blowing agents may be flammable. The most preferred partially fluorinated hydrocarbon auxiliary physical blowing agents are, 1,1-difluorethane (HFC-152a) and 1,1,1-trifluoroethane (HFC-143a). It is also contemplated that 1,1-chloroethane (HFC-142b) and 1-1-dichloro-2-fluoroethane (HFC-141b) may be added as auxiliary blowing agents for non-regulated insulation applications.

The optional additives used in the process preferably provide specific, non-mechanical physical properties to the foamed product and do not interfere with or influence the extrusion of the foamed product. Additives may constitute from about 0.05 to about 5 weight percent of the total polymeric foam rate. Examples of additives include but are not limited to antistats, fire retardants, perfumes, ultra-violet (UV) light absorber, UV stabilizers, and infra-red light tracers.

Similarly, colorants used in the process preferably include specific additives included solely for the purpose of providing a desired color to the foamed product that is different from the natural color provided by the alkenyl aromatic polymer when foamed. Examples of colorants include various pigments and color concentrates as known in the art, such as carbon black and titanium dioxide white. The preferred form of colorant for addition to the extruder is in a pellet consisting of about 1 to about 40 weight percent of the color material compounded in an alkenyl aromatic polymer such as polystyrene that may be different from the alkenyl aromatic polymer used for the foam. The most preferred form of colorant for addition to the extruder is in a pellet consisting of about 5 to about 20 weight percent of the color material compounded in the same alkenyl aromatic polymer as used for the foam. The most preferred concentration of additive is from 0.2 to 2.0 weight percent of the total extruder flow rate.

INVENTIVE EXAMPLE 1

Pellets of a previously extruded mixture of Dart Polymers, Inc. PS101 high heat crystal polystyrene (specific gravity of about 1.05 g/cm$^3$ and a melt index (MI) of about 1.8 dg/min.) and an undetermined level, between 1.0 and 5.0 weight percent, of Phillips K-Resin (styrene-butadiene copolymer) was mixed with 0.50 weight percent of Huntsman 27678 1 talc concentrate pellets. The pellet mixture was heated to form a blend in a 32:1 L:D Battenfeld Gloucester Engineering Co., Inc. 2.5-inch (35.3 cm) single-screw extruder operating at a screw speed of about 95 rpm. Pressurized commercial-grade carbon dioxide (31.0 MPa) was injected at a rate of 2.31 kg/hr. The polymer melt and carbon dioxide were mixed and further heated to a melt temperature of about 209 C and pressurized to 26.9 MPa at the extruder discharge.

The heated mixture was then transferred through a heated pipe to a second, larger 3.5 inch (89 mm) single-screw cooling extruder operating at 25 rpm. Subsequently, the extrudate was cooled to a melt temperature of about 149 C and pressurized to about 21.4 MPa for delivery at about 75 kg/hr into a 5.40-cm diameter annular die.

The extrudate is pulled from the die by downstream equipment which is operating at about 244 mm/sec (9.61 inches/sec) and is drawn into contact with a choke ring having an inner surface diameter of 5.55 cm (2.19 inches) and a choke ring gap size of 0.762 mm (0.03 inch), for a contact time of 3.13 ms. The choke ring temperature was regulated by the flow of cooling water which was maintained at 27 C. The foam remained in contact with the inner surface of the choke ring for a distance of about 6.4 mm, resulting in a constrainment time of about 26 ms. The foam was then allowed to expand freely and was subsequently drawn over a mandrel to form a foam having a density of 59.0 kg/m$^3$, an average thickness of 2.22 mm, and an average cell size of 0.25 mm. The foam is free of corrugations visible to the unaided eye by light transmission.

INVENTIVE EXAMPLE 2

This example is similar to Inventive Example 1 with reduction of the talc concentrate level to 0.25 weight percent and an increase of the cooling water temperature on the choke ring to 63 C and a reduction of the line speed to 199 mm/sec.

The contact time was 3.83 ms. The constrainment time was about 32 ms. The foam was then allowed to expand freely and was subsequently drawn over a mandrel to form a foam having a density of 60.0 kg/m$^3$, an average thickness of 2.57 mm, and an average cell size of 0.35 mm. The foam is free of corrugations visible to the unaided eye by light transmission.

INVENTIVE EXAMPLE 3

This example is similar to Inventive Example 2 with a change to a blowing agent blend comprising 80 mole percent carbon dioxide and 20 mole percent Phillips Chemical Company commercial grade isopentane at a total injection rate of 2.54 kg/hr. Other adjustments were a cooling extruder screw speed of 26 rpm, choke ring cooling water temperature to 32 C and line speed to 203 mm/sec.

The contact time was 3.75 ms. The constrainment time was about 31 ms. The foam was then allowed to expand freely and was subsequently drawn over a mandrel to form a foam having a density of 60.6 kg/m$^3$, an average thickness of 2.56 mm, and an average cell size of 0.31 mm. The foam is free of corrugations visible to the unaided eye by light transmission.

INVENTIVE EXAMPLE 4

This example is similar to Inventive Example 3 with a change to a blowing agent blend comprising 62 mole percent carbon dioxide and 38 mole percent Phillips Chemical Company commercial grade isopentane at a total physical blowing agent injection rate of 2.27 kg/hr. The line speed was changed to 221(8.70 inches/sec).

The contact time was 3.45 ms. The constrainment time was about 29 ms. The foam was then allowed to expand freely and was subsequently drawn over a mandrel to form a foam having a density of 82.2 kg/m$^3$, an average thickness of 1.78 mm, and an average cell size of 0.31 mm. The foam is free of corrugations visible to the unaided eye by light transmission.

INVENTIVE EXAMPLE 5

This example is similar to Inventive Example 1 with reduction of the carbon dioxide rate to 1.95 kg/hr, an increase of the choke ring cooling water temperature to 32 C and a reduction of the line speed to 156 mm/sec (6.14 inches/sec).

The contact time was 4.89 ms. The constrainment time was about 41 ms. The foam was then allowed to expand freely and was subsequently drawn over a mandrel to form a foam having a density of 70.1 kg/m$^3$, an average thickness of 2.87 mm, and an average cell size of 0.30 The foam is free of corrugations visible to the unaided eye by light transmission.

COMPARATIVE EXAMPLE 6

This example is similar to Inventive Example 2 with the elimination of the choke ring and change of the nucleating agent from a talc concentrate to a powdered talc. The extrusion rate was 80.7 kg/hr.

The foam was allowed to expand from the die freely and was subsequently drawn over a mandrel to form a foam having a density of 59.9 kg/m$^3$, an average thickness of 3.25 mm, and an average cell size of 0.59 mm. The foam has large cells and moderate corrugations that have visible thickness variations on the surface of the foam.

COMPARATIVE EXAMPLE 7

This example is similar to Comparative Example 6 with a change of the nucleating agent to Boehringer Ingelheim Hydrocerol Compound (a mixture of citric acid and sodium bicarbonate in a proprietary carrier).

The foam was allowed to expand from the die freely and was subsequently drawn over a mandrel to form a foam having a density of 85.7 kg/m$^3$, an average thickness of 1.49 mm, and an average cell size of 0.34 mm. The foam has large cells and severe corrugations that have visible thickness variations on the surface of the foam.

COMPARATIVE EXAMPLE 8

This example is similar to Inventive Example 3 with the elimination of the choke ring. The foam was allowed to expand from the die freely and was subsequently drawn over a mandrel to form a foam having a density of 74.7 kg/m$^3$, an average thickness of 1.84 mm, and an average cell size of 0.35 mm. The foam has large cells and moderate corrugations that have visible thickness variations on the surface of the foam.

COMPARATIVE EXAMPLE 9

This example is also similar to Comparative Example 8 with a change of carbon dioxide/isopentane mole fraction ratio from 80/20 to 70/30. The foam was allowed to expand from the die freely and was subsequently drawn over a mandrel to form a foam having a density of 79.8 kg/m$^3$, an average thickness of 1.63 mm, and an average cell size of 0.29 mm. The foam has large cells and moderate corrugations that have visible thickness variations on the surface of the foam.

COMPARATIVE EXAMPLE 10

This example is similar to Inventive Example 1 except that the choke ring had an inner surface diameter of 66.04 mm, resulting in a gap of 6 mm (0.24 inches) and a contact time of 38 ms. The resultant foam was corrugation-free and had a thickness of 2.91 mm, a density of 66.4 kg/m, and an average cell size of 0.42 mm.

COMPARATIVE EXAMPLE 11

This example is similar to Inventive Example 1 except that a choke ring having an inner surface diameter of 63.12 mm, resulting in a gap of 4.6 mm (0.18 inches) and a contact time of 20 ms, was used. The resultant foam has severe corrugation and had a thickness of 2.46 mm, a density of 54.1 kg/m$^3$, and an average cell size of 0.26 mm.

COMPARATIVE EXAMPLE 12

Comparative Example 12 is similar to Comparative Example 11 except that the contact time was 30 ms, which resulted in a foam having severe corrugation with a thickness of 3.08 mm, a density of 65.8 kg/m$^2$, and an average cell size of 0.27 mm.

The key results of the examples are summarized in Table 1. [t1]

advantageous in that the blowing agent can comprise 100 percent $CO_2$ which has superior environmental and safety characteristics as compared to the hydrocarbon and hydrofluorocarbon blowing agents. The radial distance $r_c$ for a choke ring providing an acceptable foam is less than 30 mm, preferably less than 28 mm. The line speed is less than 300 mm/second, preferably between about 150–250 mm/s. The prior art foams made with a choke ring having contact times greater than 20 ms did not produce a suitable foam because either the corrugation or cell size was too great. The prior art foams made without a choke ring were not suitable because both the corrugation and the cell size were too great.

While the present invention has been described with reference to one or more particular embodiments, those skilled in the art will recognize that many changes may be made thereto without departing from the scope and intentions of the present invention. Those variations thereof are contemplated to fall within the scope and intention of the described invention.

The invention claimed is:

1. An apparatus for extruding a polymeric foam from an extrudate comprising a polymeric resin and a blowing agent for providing the extrudate with a cellular structure upon extrusion, the apparatus comprising:

an extruder having an inlet adapted to receive the extrudate;

an extrusion die having an annular die opening forming an outlet for the extruder through which the extrudate is adapted to be pulled at a predetermined line speed, the extrusion die defining a longitudinal axis, and the annular die opening being concentrically oriented relative thereto and positioned therefrom at a first radial distance;

a choke ring having an opening defined by an annular choke ring surface, the choke ring being positioned relative to the extruder such that the annular die opening is received within the choke ring opening, the choke ring opening being concentric about the longitudinal axis and positioned therefrom a second radial distance; and wherein the difference between the second radial distance and the first radial distance comprises a gap, the size of

TABLE 1

| Example Number | Physical Blowing Agent | | Extruded Density (kg/m$^3$) | Average Cell Size (mm) | Thickness (mm) | Corrugation |
|---|---|---|---|---|---|---|
| | $CO_2$ Mole Fraction | Isopentane Mole Fraction | | | | |
| INVENTIVE FOAMS | | | | | | |
| 1 | 100% | 0% | 59.0 | 0.25 | 2.22 | None |
| 2 | 100% | 0% | 60.0 | 0.35 | 2.57 | None |
| 3 | 80% | 20% | 60.6 | 0.31 | 2.56 | None |
| 4 | 62% | 38% | 82.2 | 0.27 | 1.78 | None |
| 5 | 100% | 0% | 70.1 | 0.30 | 2.87 | None |
| COMPARATIVE FOAMS | | | | | | |
| 6 | 100% | 0% | 59.9 | 0.59 | 3.25 | Moderate |
| 7 | 100% | 0% | 85.7 | 0.34 | 1.49 | Severe |
| 8 | 80% | 20% | 74.7 | 0.35 | 1.84 | Moderate |
| 9 | 70% | 30% | 79.8 | 0.29 | 1.63 | Moderate |
| 10 | 100% | 0% | 66.4 | 0.42 | 2.91 | None |
| 11 | 100% | 0% | 54.1 | 0.26 | 2.46 | Severe |
| 12 | 100% | 0% | 65.8 | 0.27 | 3.08 | Severe |

As can be seen, the invention with its choke ring and reduced contact times result in a highly desirable commercial foam having a cell size within the preferred range of 0.20 to 0.35 without any corrugation, regardless of the percentage of carbon dioxide. The invention is further the gap being determined by the ratio of the gap (in units of millimeters) to the line speed (in units of millimeters per second) and the ratio ranges from 0.001 to 0.020 second.

2. An apparatus according to claim 1 wherein the gap is less than 4.57 millimeters.

3. An apparatus according to claim 2 wherein the gap is less than or equal to 0.8 millimeter.

4. An apparatus according to claim 3 wherein the gap is about 0.76 millimeter.

5. An apparatus according to claim 1 wherein the die is symmetrical relative to the longitudinal axis.

6. An apparatus according to claim 1 wherein the die is a generally cylindrical body having an annular slot defining the die opening.

7. An apparatus according to claim 6 wherein the die further comprises an annular ridge extending from the cylindrical body and terminating in a peak and the annular slot is located at the peak.

8. An apparatus according to claim 1 wherein the second radial distance is less than 30 millimeters.

9. An apparatus according to claim 8 wherein the second radial distance is less than 28 millimeters.

10. An apparatus according to claim 1 wherein the gap is less than or equal to 0.8 millimeter.

11. An apparatus according to claim 10 wherein the line speed is less than 250 millimeters per second.

12. An apparatus according to claim 11 wherein the second radial distance is less than 28 millimeters.

13. An apparatus for extruding a polymeric foam from an extrudate comprising a polymeric resin and a blowing agent for providing the extrudate with a cellular structure upon extrusion, the apparatus comprising:

an extruder having an inlet adapted to receive the extrudate;

an extrusion die having an annular die opening forming an outlet for the extruder through which the extrudate is adapted to be pulled at a predetermined line speed, the extrusion die defining a longitudinal axis, and the annular die opening being concentrically oriented relative thereto and positioned therefrom at a first radial distance;

a choke ring having an opening defined by an annular choke ring surface, the choke ring being positioned relative to the extruder such that the annular die opening is received within the choke ring opening, the choke ring opening being concentric about the longitudinal axis and positioned therefrom a second radial distance; and wherein the difference between the second radial distance and the first radial distance defines a gap between the choke ring and the die opening and the gap is set so that the extrudate leaving the annular die opening contacts the annular choke ring surface within a contact time of 1.0 to 20.0 milliseconds.

14. An apparatus according to claim 11 wherein the gap is less than 4.57 millimeters.

15. An apparatus according to claim 14 wherein the gap is less than or equal to 0.8 millimeter.

16. An apparatus according to claim 15 wherein the gap is about 0.76 millimeter.

17. An apparatus according to claim 13 wherein the second radial distance is less than 30 millimeters.

18. An apparatus according to claim 17 wherein the second radial distance is less than 28 millimeters.

19. An apparatus for extruding a polymeric foam from an extrudate comprising a polymeric resin and a blowing agent for providing the polymeric resin with a cellular structure upon extrusion, the apparatus comprising:

an extruder having an inlet adapted to receive an extrudate;

an extrusion die having an outer periphery with an annular die opening located in the outer periphery and forming an outlet for the extruder, the outer periphery of the extrusion die being located at the annular die opening, the extrusion die defines a longitudinal axis, and the annular die opening is concentrically oriented relative thereto and positioned therefrom at a first radial distance;

a choke ring having a choke ring opening defined by an annular choke ring surface and the choke ring is positioned relative to the extruder such that the annular die opening is received within the choke ring opening, the choke ring opening is concentric about the longitudinal axis and positioned therefrom a second radial distance; and wherein the difference between the second radial distance and the first radial distance defines a gap between the choke ring and the die opening and the gap is less than 4.57 millimeters.

20. An apparatus according to claim 19 wherein the gap is less than or equal to 0.8 millimeter.

21. An apparatus according to claim 20 wherein the gap is about 0.76 millimeter.

22. An apparatus according to claim 19 wherein the die is symmetrical relative to the longitudinal axis.

23. An apparatus according to claim 19 wherein the die is a generally cylindrical body having an annular slot defining the die opening.

24. An apparatus according to claim 19 wherein the second radial distance is less than 30 millimeters.

25. An apparatus according to claim 24 wherein the second radial distance is less than 28 millimeters.

26. An apparatus for extruding a polymeric foam from an extrudate comprising a polymeric resin and a blowing agent for providing the extrudate with a cellular structure upon extrusion, the apparatus comprising:

an extruder having an inlet adapted to receive the extrudate;

an extrusion die having an annular die opening forming an outlet for the extruder through which the extrudate is adapted to be pulled at a predetermined line speed, the extrusion die defining a longitudinal axis, and the annular die opening being concentrically oriented relative thereto and positioned therefrom at a first radial distance;

a choke ring having an opening defined by an annular choke ring surface, the choke ring being positioned relative to the extruder such that the annular die opening is received within the choke ring opening, the choke ring opening being concentric about the longitudinal axis and positioned therefrom a second radial distance; and wherein the difference between the second radial distance and the first radial distance defines a gap between the choke ring and the die opening and the gap is less than 4.57 millimeters.

27. An apparatus according to claim 26 wherein the gap is less than or equal to 0.8 millimeter.

28. An apparatus according to claim 27 wherein the gap is about 0.76 millimeter.

29. An apparatus according to claim 26 wherein the die is symmetrical relative to the longitudinal axis.

30. An apparatus according to claim 26 wherein the die is a generally cylindrical body having an annular slot defining the die opening.

31. An apparatus according to claim 26 wherein the second radial distance is less than 30 millimeters.

32. An apparatus according to claim 31 wherein the second radial distance is less than 28 millimeters.

33. An apparatus for extruding a polymeric foam from an extrudate comprising a polymeric resin and a blowing agent for providing the polymeric resin with a cellular structure upon extrusion, the apparatus comprising:
 an extruder having an inlet adapted to receive an extrudate;
 an extrusion die having an outer periphery with an annular die opening located in the outer periphery and forming an outlet for the extruder, the outer periphery of the extrusion die being located at the annular die opening, the extrusion die defines a longitudinal axis, and the annular die opening is concentrically oriented relative thereto and positioned therefrom at a first radial distance;
 a choke ring having a choke ring opening defined by an annular choke ring surface and the choke ring is positioned relative to the extruder such that the annular die opening is received within the choke ring opening, the choke ring opening is concentric about the longitudinal axis and positioned therefrom a second radial distance; and
 wherein the difference between the second radial distance and the first radial distance defines a gap between the choke ring and the die opening and the gap is set so that the extrudate leaving the annular die opening contacts the annular choke ring surface within a contact time of 1.0 to 20.0 milliseconds.

34. An apparatus according to claim 33 wherein the gap is less than 4.57 millimeters.

35. An apparatus according to claim 34 wherein the gap is less than or equal to 0.8 millimeter.

36. An apparatus according to claim 35 wherein the gap is about 0.76 millimeter.

37. An apparatus according to claim 33 wherein the die is symmetrical relative to the longitudinal axis.

38. An apparatus according to claim 33 wherein the die is a generally cylindrical body having an annular slot defining the die opening.

39. An apparatus according to claim 33 wherein the second radial distance is less than 30 millimeters.

40. An apparatus according to claim 39 wherein the second radial distance is less than 28 millimeters.

41. An apparatus for extruding a polymeric foam from an extrudate comprising a polymeric resin and a blowing agent for providing the polymeric resin with a cellular structure upon extrusion, the apparatus comprising:
 an extruder having an inlet adapted to receive an extrudate;
 an extrusion die having an outer periphery with an annular die opening located in the outer periphery and forming an outlet for the extruder through which the extrudate is adapted to be pulled at a predetermined line speed, the outer periphery of the extrusion die being located at the annular die opening, the extrusion die defines a longitudinal axis, and the annular die opening is concentrically oriented relative thereto and positioned therefrom at a first radial distance;
 a choke ring having a choke ring opening defined by an annular choke ring surface and the choke ring is positioned relative to the extruder such that the annular die opening is received within the choke ring opening, the choke ring opening is concentric about the longitudinal axis and positioned therefrom a second radial distance; and
 wherein the difference between the second radial distance and the first radial distance comprises a gap, the size of the gap being determined by the ratio of the gap (in units of millimeters) to the line speed (in units of millimeters per second) and the ratio ranges from 0.001 to 0.020 second.

42. An apparatus according to claim 41 wherein the gap is less than 4.57 millimeters.

43. An apparatus according to claim 42 wherein the gap is less than or equal to 0.8 millimeter.

44. An apparatus according to claim 43 wherein the gap is about 0.76 millimeter.

45. An apparatus according to claim 41 wherein the die is symmetrical relative to the longitudinal axis.

46. An apparatus according to claim 45 wherein the die is a generally cylindrical body having an annular slot defining the die opening.

47. An apparatus according to claim 41 wherein the second radial distance is less than 30 millimeters.

48. An apparatus according to claim 47 wherein the second radial distance is less than 28 millimeters.

* * * * *